Jan. 19, 1965   E. DAVIDSON   3,165,788
INJECTION MOLD
Filed March 19, 1963
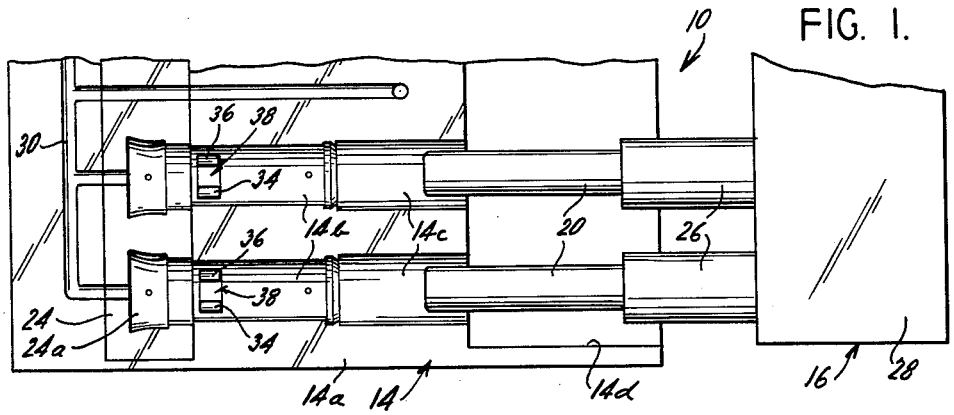
FIG. 1.
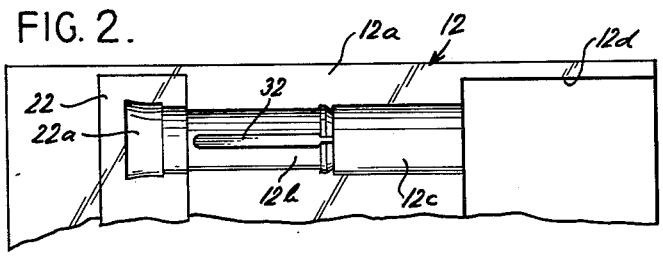
FIG. 2.
FIG. 6.
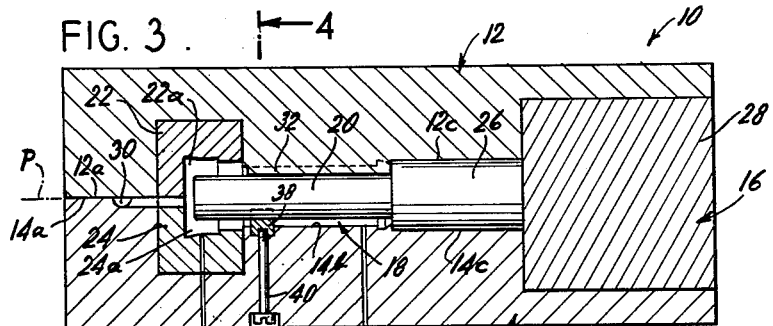
FIG. 3.
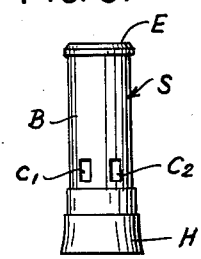
FIG. 7.
FIG. 4.
FIG. 5.
INVENTOR.
EMIL DAVIDSON
BY
Ameter + Fury
ATTORNEYS

United States Patent Office

3,165,788
Patented Jan. 19, 1965

3,165,788
INJECTION MOLD
Emil Davidson, Scarsdale, N.Y., assignor to Guild Molders, Inc., Elmsford, N.Y., a corporation of New York
Filed Mar. 19, 1963, Ser. No. 266,326
5 Claims. (Cl. 18—42)

The present invention relates generally to molds for the manufacture of plastic articles, and in particular to a multi-part injection mold useful in the manufacture of a slotted internal shell or lipstick cup holder of the type employed in a lipstick case.

A lipstick case usually includes a slotted internal cylindrical shell which is formed at one end with an enlarged base or head and is provided throughout its length with an elongated slot or guideway communicating with the interior thereof. The lipstick is mounted within the shell and is adapted to be successively projected through the open end of the shell remote from the enlarged base or head. The lipstick is supported on a cup which is formed with a nib or cam follower which projects through the longitudinal slot or guideway in the shell wall and is engaged within a spiral cam or track formed on the internal surface of an outer shell or case. The spiral track, which serves as a cam and is effective to bring about axial displacement of the inner shell relative to the outer shell in response to relative rotation therebetween, may be formed integrally with the outer shell or may be in the form of a separate insert mounted within the outer shell. For the proper and smooth operation of this type of lipstick case, it is important that the wall thicknesses of the inner shell be uniform, both longitudinally and circumferentially. Variations in wall thickness will manifest themselves in improper operation and/or disengagement of the nib or cam follower from the spiral track on the outer shell and a consequent malfunction of the unit.

Usually, the inner shell is injection molded, using a three-part mold; and variations in wall thickness of the molded part occur because of the displacement of the cantilevered core member within the cavity due to non-uniform pressures which build up within the mold incident to the injection of the plastic. As the cantilevered core member is displaced from its position axially of the cavity, there is introduced a corresponding non-uniformity in the wall thicknesses about the circumference and along the length of the part to be molded which varies as a function of the magnitude and direction of displacement. Numerous suggestions have been made for incorporating means within the mold to maintain the cantilevered core member in axial alignment, even while under the stress of the unequal forces occurring during the high pressure injection of the plastic. One such suggestion involves the provision within the mold of diametrically opposed supports for the free end of the cantilevered core member. A typical multi-part injection mold includes first and second cavity parts which are movable towards and away from each other between open and closed positions, with the cavity parts having confronting faces meeting on a parting plane when the cavity parts are in the closed position and having formed therein a mold cavity for the article to be molded, such as the tubular inner shell for the lipstick case. A core part is disposed symmetrically of the parting plane and is movable at right angles to the first and second cavity parts between the open and closed positions. The core part has a cantilevered core member supported at one end and extending into the mold cavity in axial alignment therewith when the cavity and core parts are in their respective closed positions. The suggestion in the prior art has been to provide an elongated rib on one of the cavity parts which is formed lengthwise of the corresponding portion of the mold cavity and projects inwardly into engagement with the adjacent side of the core member and a short lug on the other of the cavity parts located diametrically opposite the rib for engagement with the core member contiguous to the free end thereof and at a location substantially 180° removed from the rib. However, experience with diametrically opposed supports for the cantilevered core member indicates that they are capable of maintaining orientation of the core member relative to the cavity in only the diametrical plane occupied by the supports. The high pressures which are built up within the mold cavity incident to injection of the plastic manifest themselves in all directions; and there is a tendency for the core member to shift in a direction having motion components substantially at right angles to the diametrical plane occupied by the rib and lug with the formation of corresponding non-uniform wall thicknesses.

Broadly, it is an object of the present invention to provide a multi-part injection mold which obviates one or more of the aforesaid difficulties. Specifically, it is within the contemplation of the present invention to provide a support for a cantilevered core member in a multi-part injection mold which maintains the core member in axial alignment with the cavity and against displacement incident to the high pressure injection of plastic into the mold cavity and thereby produces a molded article having wall thicknesses which are uniform and held substantially to the tolerances of the mold. Advantageously, the present construction may be employed to manufacture the inner longitudinally slotted shell for a lipstick case of generally known construction.

In an illustrative embodiment demonstrating objects and features of the present invention, there is provided a tripod support for the core member which is arranged to maintain the core member in an oriented position relative to the first and second cavity parts during injection molding. The tripod support includes three projections on the first and second cavity parts extending into the mold cavity and engaging the core at three circumferential locations spaced from the supported end thereof. One of the projections is on the first cavity parts and longitudinally engages the core member from the supported end to the corresponding circumferential location. During molding, the one projection which engages the core member substantially throughout its length forms a corresponding elongated slot or guideway in the shell. In the final assembly, the walls of the slot engage the cam follower which projects therethrough and engages the spiral cam track in the outer shell. The other two of the projections are on the second cavity part and longitudinally engage the core member from the intermediate locations spaced from the supported end to their corresponding circumferential locations. The lengths of the other two projections are not such as to interfere with the structural strength of the inner shell and the corresponding short slots molded in the inner shell usually serve no functional purpose. The one projection on the first cavity part is disposed symmetrically of the diametrical plane through the core member extending at right angles to the parting plane, while the other two projections are disposed on opposite sides of the diametrical plane and are angularly oriented relative thereto to provide the tripod support which maintains the cantilevered core member in concentric relation to the cavity.

The above brief description as well as further objects, features and advantages of the present invention will be more fully appreciated by reference to the following detailed description of a presently preferred, but nonetheless illustrative embodiment in accordance with the present invention, when taken in conjunction with the accompanying drawings, wherein:

FIG. 1 is a plan view, with the upper cavity part removed and looking at the upper face of the lower cavity part and with the core in a partially retracted position;

FIG. 2 is a fragmentary plan view of the upper cavity part, looking up at the lower face thereof;

FIG. 3 is a longitudinal section through the three-part injection mold, with the upper and lower cavity parts and the core part in their respective closed positions;

FIG. 4 is a sectional view taken substantially along the line of 4—4 in FIG. 3 looking in the direction of the arrows, and on an enlarged scale, showing the tripod support for the free end of the cantilevered core member of the injection mold;

FIG. 5 is an enlarged fragmentary perspective view of a portion of the lower cavity part, with the projection-forming insert removed from its corresponding seat to illustrate details thereof;

FIG. 6 is an elevational view of the slotted inner shell for a lipstick case which may be manufactured with the present injection mold, the view being taken to show the two relatively short slots formed incident to the engagement of the underside of the cantilevered core by the two adjacent projections; and FIG. 7 is a view similar to FIG. 6, but taken from the upper side of the mold and showing the elongated slot or guideway which is formed incident to the engagement of the cantilevered core substantially throughout its length by the elongated projection on the upper cavity part.

Referring now specifically to the drawings, there is shown a multi-part injection mold demonstrating features of the present invention which is generally designated by the reference numeral 10 and includes a first or upper cavity part 12 (see FIGS. 2 and 3), a second or lower cavity part 14 (see FIGS. 1 and 3) and a core part 16 (see FIGS. 1 and 3). The multi-part injection mold 10 is illustrated of a construction suitable for the injection molding of a slotted inner shell S for a conventional lipstick case of the type previously described. As seen in FIGS. 6 and 7, the inner shell S has an enlarged head or base H which may be manually grasped by the user and an elongated tubular body B which is preferably of substantially uniform wall thickness throughout its length and terminates at an open end E which is bounded by a somewhat enlarged rim. At two spaced circumferential locations adjacent to and spaced from the body B, the tubular body wall B of the shell S is formed with two relatively short substantially rectangular cut-outs $C_1$, $C_2$ (see FIG. 6) which serve no functional purpose in the final assembly, but are formed incident to the molding operation by two projections of the tripod support, as will be described. At a location removed from the cut-outs $C_1$, $C_2$ in an amount in excess of 90° as measured about the circumference of the tubular body wall B, there is formed an elongated slot or guideway G. The slot G has a closed end at the end of the tubular body wall B contiguous to the base or enlarged head H and an open end of somewhat restricted width which extends through the bounding rim about the corresponding open end E of the tubular body wall B. The guideway G may have both of its ends closed, but the one opened end facilitates the insertion into the guideway of the nib or cam follower during assembly of the lipstick case. As is generally understood, the interior of the tubular body B receives the lipstick proper which is mounted on the cup holder which has a nib or cam follower projecting through the guideway or slot G into the spiral cam track on the outer shell of the lipstick case. Usually, the user grasps the enlarged head H in one hand and the outer shell in the other, and in response to relative rotation between the inner and outer shells causes a corresponding extension of the lipstick through the open end E of the tubular body B. Although the multi-part injection mold 10 is specifically designed for the manufacture of the illustrated slotted shell S, it will be appreciated that the same finds useful application in the manufacture of other tubular articles, provided that such articles can functionally and/or structurally tolerate the presence of the slots formed incident to the molding operation.

Referring now specifically to FIGS. 1 through 5 inclusive, there follows a detailed description of the three parts 12, 14, 16 of the multi-part injection mold 10 which is particularly suited for the manufacture of the inner shell S for the lipstick case illustrated and described in conjunction with FIGS. 6 and 7. The upper and lower cavity parts 12, 14 have confronting faces 12a, 14a which meet in a parting plane, designated by the letter P in FIG. 3, when the cavity parts, 12 14 are in the closed position. In such closed position, the cavity parts 12, 14 cooperate to define a mold cavity for the shell S, the cavity being generally designated by the reference numeral 18 in FIG. 3. The core part 16 is disposed symmetrically of the parting plane P and is movable at right angles to the first and second cavity parts 12, 14 between open and closed positions. The core part 16 has a cantilevered core member 20 which is supported at one end and extends into the mold cavity 18 when the cavity and core parts are in their respective closed positions, as illustrated in FIG. 3. Usually, the timing is such that the core part 16, moves horizontally into the closed position, followed by the vertical closing of the upper and lower cavity parts 12, 14 about the core part 16.

Since the construction of the multi-part injection mold 10 is generally known and subject to a latitude of modification and change, details thereof will only be briefly described in terms of one core and cavity. Specifically, the upper cavity part 12 includes an upper head-forming insert 22 which is machined away as indicated at 22a to form the corresponding upper half of the head-forming end of the mold cavity 18. In similar fashion, the lower cavity part 14 has a lower head forming insert 24 which is machined away as indicated at 24a to form the corresponding lower half of the head-forming end of the mold cavity 18.

The tubular body B of the slotted shell S is generally defined by the corresponding upper and lower main cavity sections 12b, 14b formed in the confronting faces 12a, 14a of the upper and lower cavity parts 12, 14. Together, the main cavity sections 12b, 14b and the head-end cavity sections 22a, 24a in the head-forming inserts 22, 24 define the slotted shell S.

Additionally, the upper and lower cavity parts 12, 14 are formed with upper and lower semi-cylindrical half sections 12c, 14c of a cylindrical guideway for the corresponding cylindrical core guide member 26 which support the cantilevered core member 18. Finally, the upper and lower cavity parts 12, 14 are formed with half sections 12d, 14d of a rectangular seat which receives the core-supporting block 28 of the core part 16. Appropriate gates, such as generally designated by the reference numeral 30, are formed in one or both of the cavity parts 12, 14 for the introduction of the plastic under pressure into the cavity 18.

In accordance with the present invention, there is provided a tripod support including three projections on the first and second cavity parts 12, 14 which extend into the mold cavity 18 and engage the core member 20 at three circumferential locations spaced from the supported end thereof. In this illustrative embodiment, one of the projections, which has been generally designated by the reference numeral 32, is formed integrally with the upper cavity part 12 and extends lengthwise of the corresponding semi-cylindrical half section 12b defining the mold cavity 18. As seen in FIG. 4, the innermost end of the elongated projection 32 terminates in a curved core-contacting face or abutment 32a which conforms to the adjacent segment of the outer periphery of the cantilevered core member 20. As seen best in FIG. 2, the projection 32 is of a length and shape to define the elongated slot or guideway G in the inner sleeve S (see FIG. 7).

In this illustrative embodiment, the other two projections, which are generally designated by the reference numerals 34, 36 are formed as part of an integral projection-forming insert 38 which is seated in a corresponding socket 14e formed in the lower cavity part 14. The projection-forming insert 38 is secured within the socket 14e in any appropriate fashion, as by the provision of one or more machine bolts 40. In some instances, it may be more convenient to fabricate the projection 34, 36 as two separate inserts, with provision for separately mounting the same in the lower cavity part 14. The projections 34, 36 have their inner ends terminating in curved core-contacting faces or abutments 34a, 36a each of a curvature corresponding to the curvature of the adjacent segment of the outer periphery of the cantilevered core member 20. The projections 34, 36 engage the core member 20 from intermediate locations spaced from the end thereof supported by the cylindrical core guiding member 26 to the corresponding circumferential locations in the common transverse plane with the adjacent end of the elongated projection 32. The respective projections 32, 34, 36 are arranged to provide the necessary reaction force to maintain the cantilevered core member 20 in its coaxial position within the cavity 18 in the presence of the relatively high and non-uniform pressures developed incident to molding. In the usual three-part projection mold of this type where the upper and lower mold parts 12, 14 move vertically and the core part 16 moves horizontally, the projection 32 is disposed symmetrically of a vertically extending diametrical plane which extends through the core member 20 at right angles to the parting plane P. The projections 34, 36 are disposed on opposite sides of the diametrical plane and are at the side of the parting plane P remote from the projection 32.

The function of the tripod support 32, 34, 36 during the molding operation is to maintain the core member 20 in alignment with the cavity 18 thereby providing a molded sleeve S which has uniform wall thickness throughout its circumference and length and perfect concentricity between the inner and outer walls thereof. Thus, when incorporated into the lipstick case, there is a corresponding assurance of smooth operation, with minimum risk of the displacement of the nib or cam follower from the spiral track and the attendant malfunction of the lipstick holder.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. In a multi-part injection mold including first and second cavity parts having confronting faces meeting in a parting plane when said cavity parts are in a closed position and having formed therein a mold cavity for a substantially tubular article, and a core part disposed symmetrically of said parting plane and having a cantilevered core member supported at one end and extending into said mold cavity, the improvement comprising a tripod support for said core member arranged to maintain said core member in an oriented position relative to said first and second cavity parts during injection molding, said tripod support including three projections on said first and second cavity parts extending into said mold cavity and engaging said core member at three circumferential locations spaced from the supported end thereof.

2. In a multi-part injection mold including first and second cavity parts movable toward and away from each other between open and closed positions, said cavity parts having confronting faces meeting in a parting plane when said cavity parts are in said closed position and having formed therein a mold cavity for a substantially tubular article, and a core part disposed symmetrically of said parting plane and movable at right angles to said first and second cavity parts between open and closed positions, said core part having a cantilevered core member support at one end and extending into said mold cavity when said cavity and core parts are in their respective closed positions, the improvement comprising a tripod support for said core member arranged to maintain said core member in an oriented position relative to said first and second cavity parts during injection molding, said tripod support including three projections on said first and second cavity parts extending into said mold cavity and engaging said core member at three circumferential locations spaced from the supported end thereof.

3. In a multi-part injection mold including first and second cavity parts movable toward and away from each other between open and closed positions, said cavity parts having confronting faces meeting in a parting plane when said cavity parts are in said closed position and having formed therein a mold cavity for a substantially tubular article, and a core part disposed symmetrically of said parting plane and movable at right angles to said first and second cavity parts between open and closed positions, said core part having a cantilevered core member supported at one end and extending into said mold cavity when said cavity and core parts are in their respective closed positions, the improvement comprising a tripod support for said core member arranged to maintain said core member in an oriented position relative to said first and second cavity parts during injection molding, said tripod support including three projections on said first and second cavity parts extending into said mold cavity and engaging said core member at three circumferential locations spaced from the supported end thereof, one of said projections longitudinally engaging said core member from said supported end to its corresponding circumferential location.

4. In a multi-part injection mold including first and second cavity parts movable toward and away from each other between open and closed positions, said cavity parts having confronting faces meeting in a parting plane when said cavity parts are in said closed position and having formed therein a mold cavity for a substantially tubular article, and a core part disposed symmetrically of said parting plane and movable at right angles to said first and second cavity parts between open and closed positions, said core part having a cantilevered core member supported at one end and extending into said mold cavity when said cavity and core parts are in their respective closed positions, the improvement comprising a tripod support for said core member arranged to maintain said core member in an oriented position relative to said first and second cavity parts during injection molding, said tripod support including three projections on said first and second cavity parts extending into said mold cavity and engaging said core member at three circumferential locations spaced from the supported end thereof, one of said projections longitudinally engaging said core member from said supported end to its corresponding circumferential location, the other two of said projections longitudinally engaging said core member from intermediate locations spaced from said supported end to their corresponding circumferential locations.

5. In a multi-part injection mold including first and second cavity parts movable toward and away from each other between open and closed positions, said cavity parts having confronting faces meeting in a parting plane when said cavity parts are in said closed position and having formed therein a mold cavity for a substantially tubular article, and a core part disposed symmetrically of said parting plane and movable at right angles to said first and second cavity parts between open and closed positions, said core part having a cantilevered core member supported at one end and extending into said mold cavity when said cavity and core parts are in their respective closed positions, the improvement comprising a tripod support for said core member arranged to maintain said core member in an oriented position relative to said first and second cavity parts during injection molding, said tripod support including three projections on said first and second cavity parts extending into said mold cavity and engaging said core member at three circumferential locations spaced from the supported end thereof, one of said projections being on said first cavity part and longitudinally engaging said core member from said supported end to its corresponding circumferential location, the other two of said projections being on said second cavity part and longitudinally engaging said core member from intermediate locations spaced from said supported end to their corresponding circumferential locations, said one projection being disposed symmetrically of a diametrical plane through said core member extending at right angles to said parting plane, the other two of said projections being disposed on opposite sides of said diametrical plane.

References Cited in the file of this patent

UNITED STATES PATENTS

| | | |
|---|---|---|
| 1,692,340 | Lattin | Nov. 20, 1928 |
| 2,683,899 | Reichenbach | July 20, 1954 |
| 3,051,774 | Schelke | Aug. 28, 1962 |